United States Patent [19]

Benz

[11] Patent Number: 5,053,794
[45] Date of Patent: Oct. 1, 1991

[54] UNIVERSAL ADAPTER FOR ATTACHING A CAMERA TO ASSOCIATED OPTICAL DEVICES SUCH AS TELESCOPES, MICROSCOPES AND THE LIKE

[76] Inventor: William G. Benz, 10805 River Dr., Forestville, Calif. 95436

[21] Appl. No.: 447,676

[22] Filed: Dec. 8, 1989

[51] Int. Cl.⁵ ............................................. G03B 29/00
[52] U.S. Cl. ...................................... 354/79; 354/286; 354/295; 359/819; 359/830
[58] Field of Search .................... 354/79, 75, 76, 295, 354/354, 286, 62; 350/252, 257

[56] References Cited

U.S. PATENT DOCUMENTS

| | | | |
|---|---|---|---|
| 2,765,718 | 10/1956 | Beecher | 354/79 |
| 3,924,786 | 12/1975 | Duquette | 354/354 X |
| 4,723,864 | 2/1988 | Umeda | 354/62 X |
| 4,893,143 | 1/1990 | Sheng-Huei | 354/286 |

*Primary Examiner*—Brian W. Brown
*Assistant Examiner*—Howard B. Blankenship
*Attorney, Agent, or Firm*—John J. Leavitt

[57] ABSTRACT

Presented is a universal adapter ring for use in interconnecting a camera of the single lens reflex type to an optical device in a manner that maintains the alignment of the optical axes of the camera and optical device and secures the two together. Sets of coaxially arranged threads are formed on the spaced faces of the ring, and a resiliently deformable spring-steel band is coaxially arranged within the ring in association with adjustable screws that may be digitally manipulated to deform the spring-steel band into tight engagement with the cylindrical eyepiece of an optical device. A centrally apertured protective shield plate is also provided extending diametrically across the adapter ring to form an abutment against which the optical device may abut surrounding the aperture to prevent the optical device from impinging on the lens of the camera, or dropping into the camera when the lens is removed and for preventing stray light from entering the camera.

19 Claims, 6 Drawing Sheets

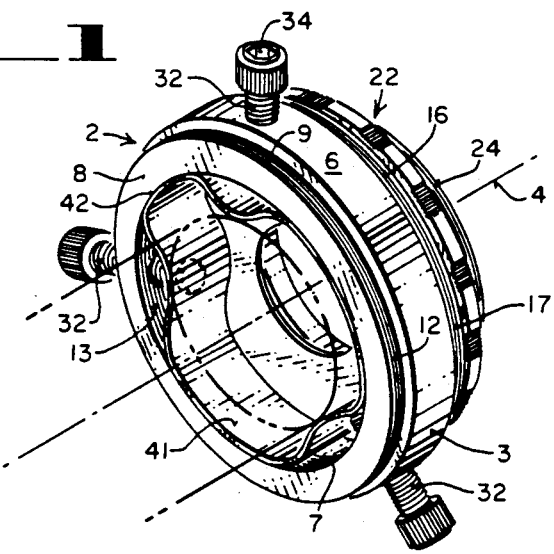
FIG_1
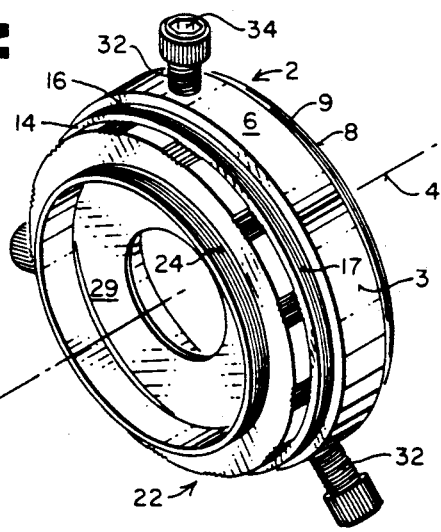
FIG_2
FIG 3A
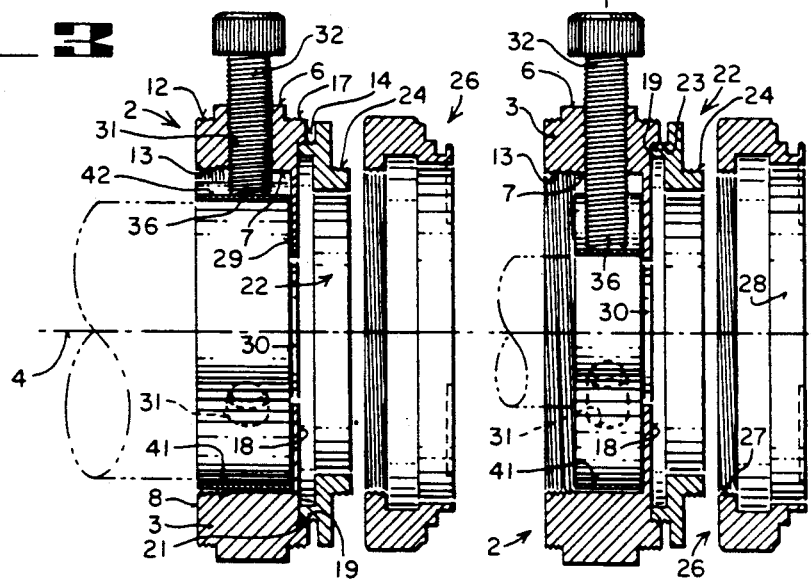
FIG_3

FIG_4
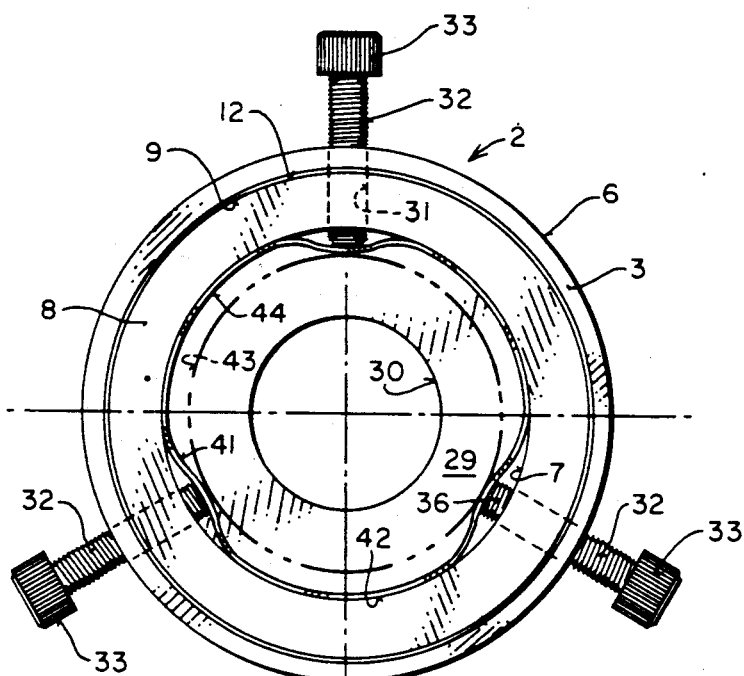
FIG_5
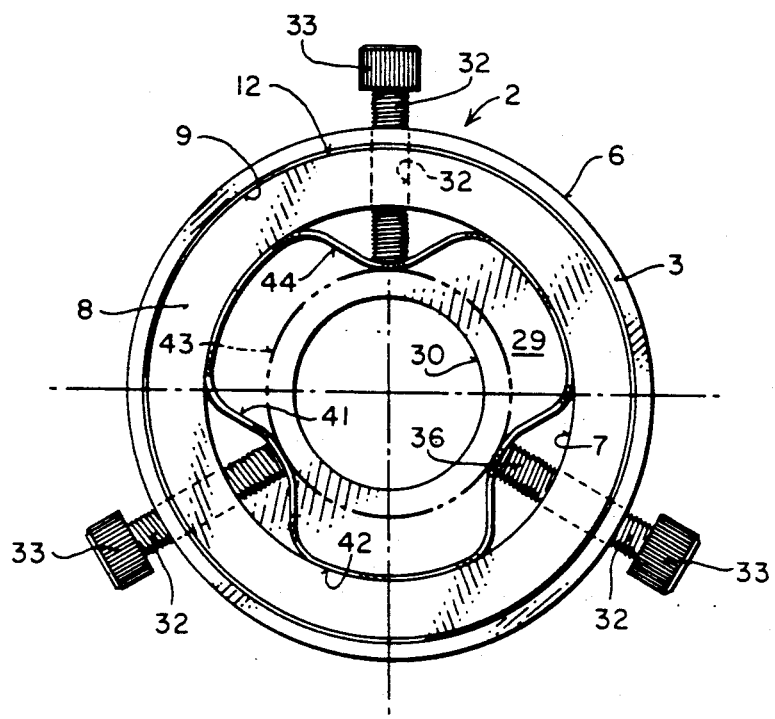

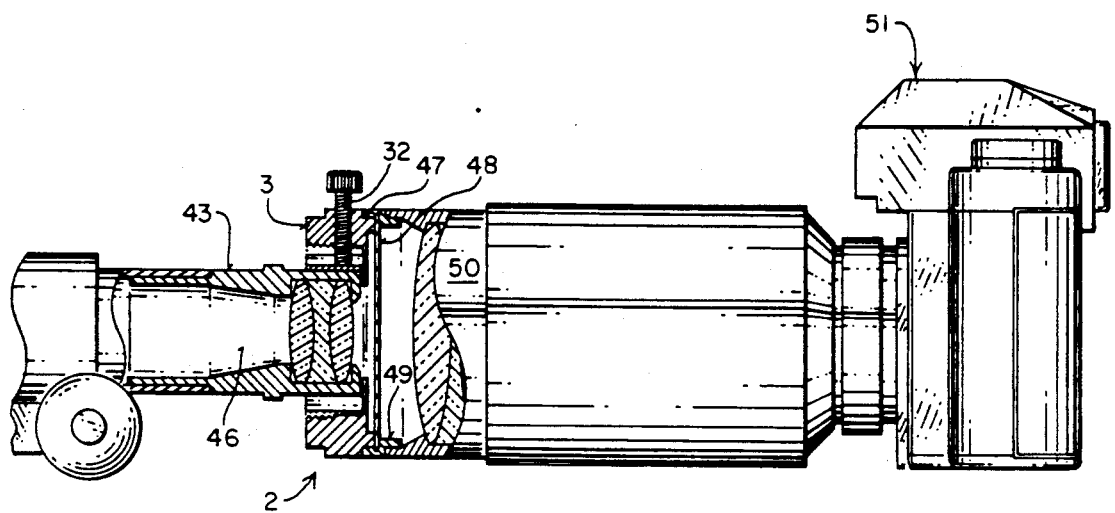
FIG_6
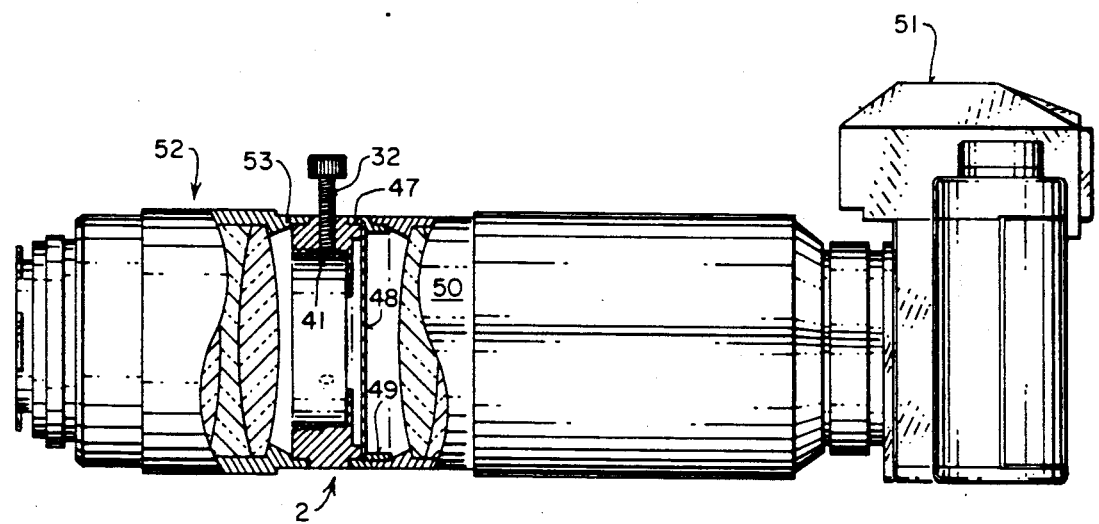
FIG_7

FIG_8
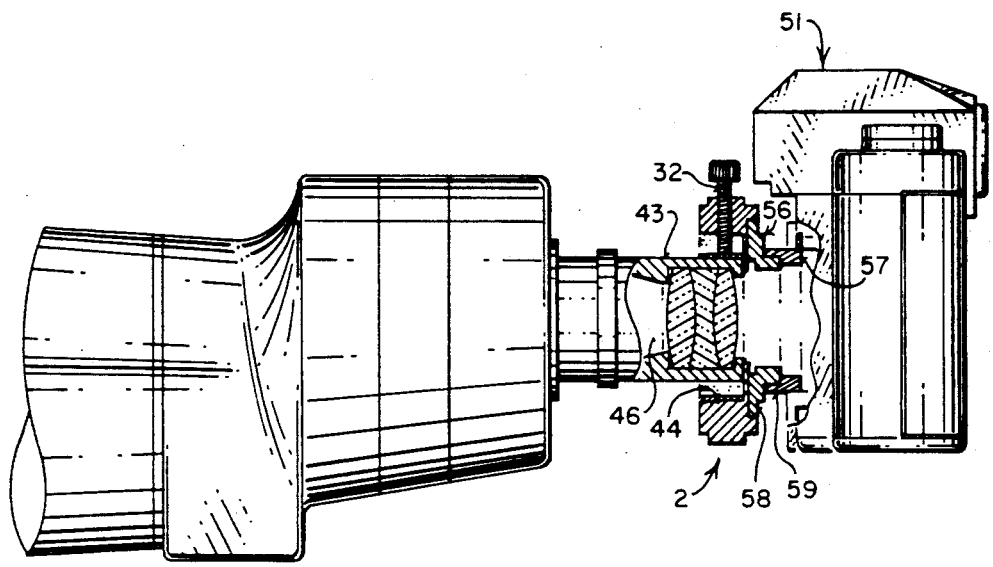
FIG_9
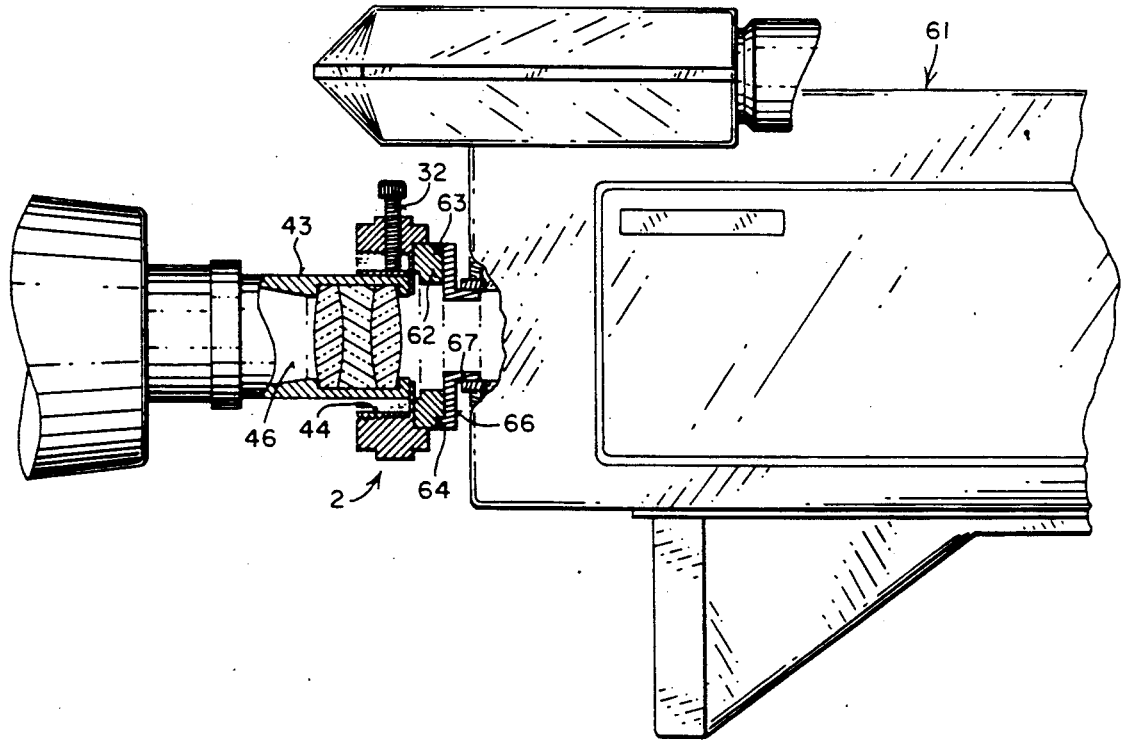

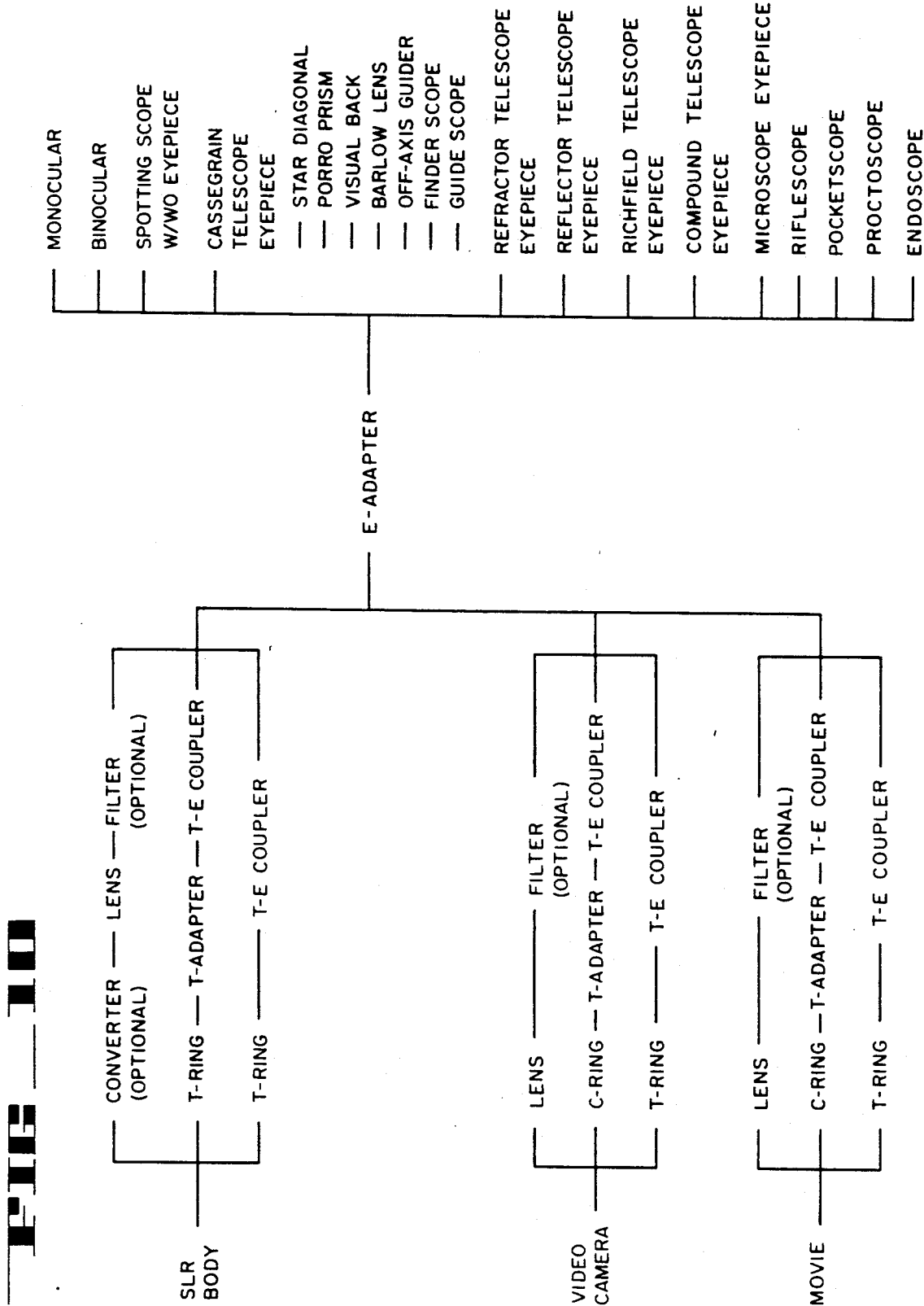

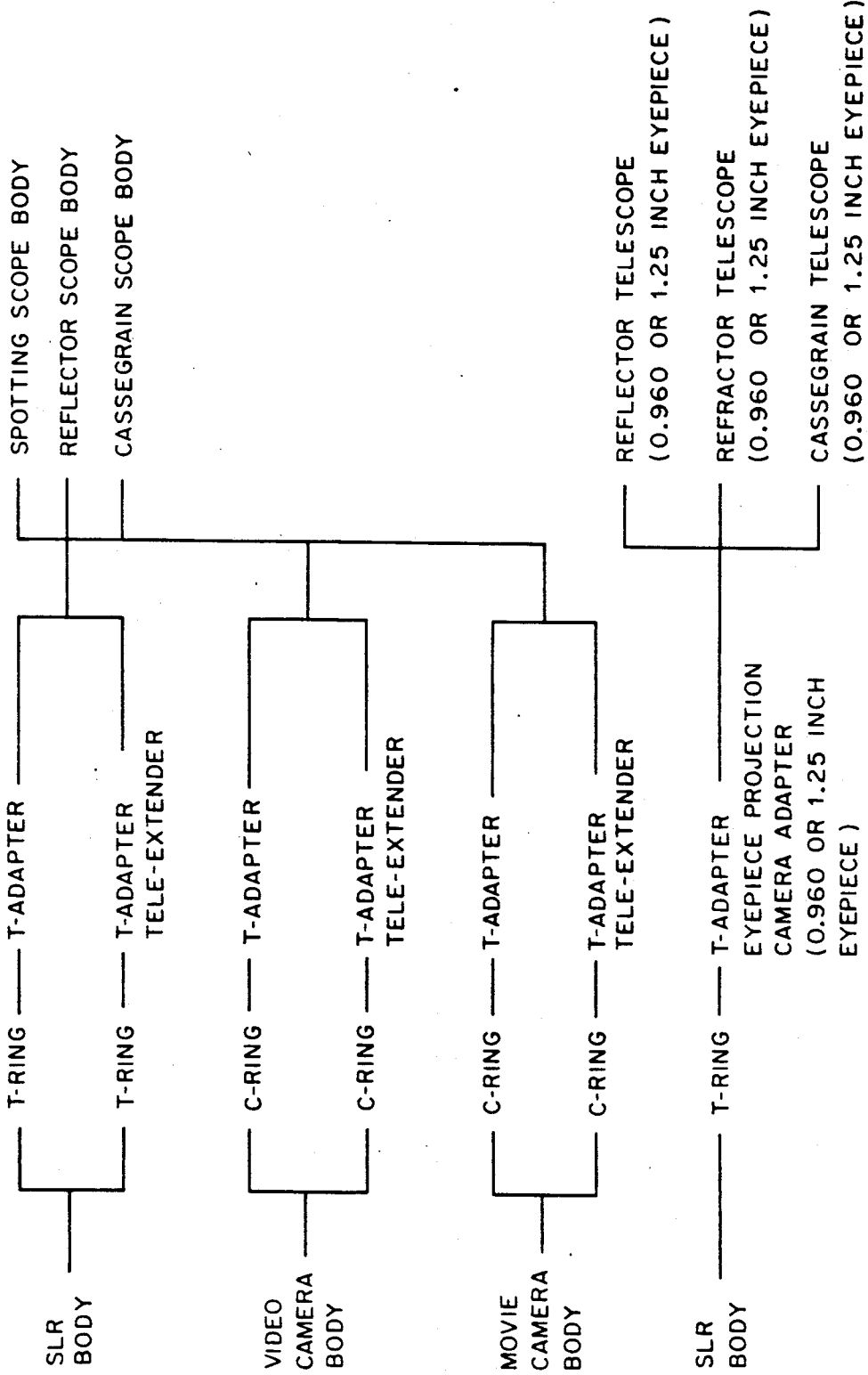

UNIVERSAL ADAPTER FOR ATTACHING A CAMERA TO ASSOCIATED OPTICAL DEVICES SUCH AS TELESCOPES, MICROSCOPES AND THE LIKE

BACKGROUND OF THE INVENTION

1. Field of the Invention

There has been a continuing need for a universal adapter that facilitates the connection of a camera lens or camera body to other optical devices such as telescopes and microscopes. This invention relates to a universal adapter that greatly facilitates and expands the range of related optical equipment to which a camera lens or camera body may be quickly and easily attached in a secure manner, and just as easily and quickly detached.

2. Description of the Prior Art

It is of course known that there are two different types of camera body adapters on the market that may be used with cameras. One such is the so-called "T-ring" that is designed with different bases for individual cameras produced by the single lens reflex camera manufacturers, and which attaches by means of a bayonet connection directly to the body of the camera upon removal of the lens. The side of the T-ring opposite the bayonet connection is provided with the substantially universal "T-thread" found on adapters such as the "T-Adapter" which constitutes a focal length tube having threads on its inner periphery at one end and threads on its outer periphery at its opposite end. The T-Adapter tube is interposed between the T-ring mounted on the camera body and the rear cell of a telescope, for instance. The other camera body adapter that is presently available on the market is called a "C-ring" for movie and video cameras that are equipped with removable lenses. The C-ring screws into the body of the movie or video camera and enables the attachment of the camera to a T-Adapter. The adapters described do not provide the versatility and wide range of applicability desirable and required by photographers interested in terrestrial-telephotography or astro-telephotography and microphotography.

It is therefore one of the primary objects of the present invention to provide a so-called "E-Adapter" that may be attached directly to the lens of a single lens reflex camera, and which is provided with additional means for attachment of the E-Adapter to an associated optical device such as a telescope or microscope. It should be noted that the "E" as used in the expression "E-Adapter" is intended to relate the adapter ring of the invention to the eyepiece of an associated optical device.

Another object of the invention is the provision of an E-Adapter that may be attached to the body of a single lens reflex camera through use of a conventional T-ring of proper size for the camera, the E-Adapter being quickly attachable to the T-ring, by a conventional coupling ring.

A still further object of the invention is the provision of an E-Adapter for SLR cameras providing means for attachment of the camera lens/body and E-Adapter directly on the ocular or eyepiece of a scope prior to mounting of the ocular on the scope. Alternatively, the E-Adapter/camera-with-lens assembly may be mounted directly on the eyepiece after mounting of the eyepiece on the scope.

Yet another object of the invention is the provision of an E-Adapter that incorporates means for the non-marring attachment of the E-Adapter to eyepieces having diameters varying from ½" up to 2".

With respect to movie and video cameras and camcorders that do not have removable lenses, I know of no "camera-to-eyepiece" adapter. Accordingly, a still further object of the invention is the provision of an E-Adapter that fulfills this need.

There is of course equipment that accepts the C-ring referred to above. Accordingly, it is a still further object of the invention to provide an E-Adapter that may be used in conjunction with a C-ring so that C-ring compatible equipment may be easily and quickly attached to various eyepieces, thus further increasing the versatility of the E-Adapter and expanding the range of applicability of the C-ring.

A still further object of the invention is the provision of an E-Adapter that constitutes an annular ring having a threaded front side and a threaded rear side and equipped with a plurality of radially extending adjustable mounting screws selectively manipulable to center and clamp a cylindrical optical member within the E-Adapter in a coaxial relationship.

Yet another object of the invention is the provision of an E-Adapter comprising an annular ring having threaded front and rear sides and equipped with radially adjustable screws that impinge within the ring upon the outer periphery of a resiliently deformable band that in turn may be caused to impinge on the outer periphery of various eyepieces of different diameters.

Still another object of the invention is the provision of an E-Adapter that functions to couple quickly in seconds and easily (without tools) the lens or body of all modern computer-controlled SLR cameras, as well as the older stop-down mode cameras, to the eyepiece of a spotting scope, telescope, binocular, monocular, microscope, or other optical device.

Yet another object of the invention is the provision of an E-Adapter that allows, when coupled to a SLR camera lens, full-frame automatic exposure capability in all of the camera's computer controlled modes, including program control, aperture/shutter priority, spot mode, multi-spot mode and manual mode.

A still further object of the invention is the provision of an E-Adapter that enables quick and easy interchange of camera lenses and 'scope' eyepieces for variations in photomagnification.

The invention possesses other objects and features of advantage, some of which, with the foregoing, will be apparent from the following description and the drawings. It is to be understood however that the invention is not limited to the specific embodiment illustrated and described, since it may be embodied in various forms within the scope of the appended claims.

SUMMARY OF THE INVENTION

In terms of broad inclusion, the adapter ring of the invention comprises an annular ring generally symmetrical about a longitudinal axis that is coincident with the optical axis of a camera and/or other optical device when the adapter is mounted thereon, and having inner and outer peripheries of predetermined diameter connected by first and second faces lying in spaced parallel planes perpendicular to the longitudinal axis. The outer periphery of the adapter ring is provided adjacent each of the first and second faces with a threaded section, while the inner periphery of the adapter ring next adjacent the first face is also provided with a threaded section. A centrally apertured protective shield plate is provided that intercepts the inner periphery of the ring and is integral therewith intermediate the first and second faces to provide first and second recesses associated, respectively, with the first and second faces of the adapter ring. The protective shield plate prevents the eyepiece from contacting the lens or falling into the body of the camera. It also prevents stray light from entering the camera when the eyepiece is attached. The inner periphery of the ring associated with the second face is somewhat larger in diameter than the inner periphery of the ring associated with the first face, and this larger inner periphery of the second face is provided with a threaded section larger in diameter than the threaded section associated with the inner periphery of the first face. Thus, the E-Adapter ring of the invention includes two coaxial threaded sections constituting a first pair of threaded sections associated with the first face and two coaxial threaded sections constituting a second pair of threaded sections associated with the second face, one threaded section from the first pair thereof being the same diameter as the corresponding threaded section of the second pair thereof. Mounted on the adapter ring so formed are at least three radially extending circumferentially spaced adjustable screws of sufficient length to extend into the adapter ring toward the central axis thereof. The screws are adjustable to impinge directly on a cylindrical member, such as an eyepiece of a telescope or microscope, or to impinge upon and deform a resiliently deformable spring-steel band mounted within the adapter ring which in turn is caused to impinge on a cylindrical body inserted into the E-Adapter ring and band so as to retain the cylindrical member coaxially within the adapter ring.

BRIEF DESCRIPTION OF THE DRAWINGS

FIG. 1 is a perspective view of one embodiment of the adapter ring of the invention shown from the direction of the first face thereof and in operative association with a conventional step-down coupler ring.

FIG. 2 is a perspective view of the adapter ring of FIG. 1 shown from the direction of the second face thereof and in operative association with a conventional step-down coupler ring.

FIG. 3 is a vertical cross-sectional view of the adapter ring of FIGS. 1 and 2, shown having a conventional step-down coupler mounted thereon and in association with a conventional T-ring.

FIG. 3A is a view similar to FIG. 3 of a second embodiment of the adapter ring of the invention.

FIG. 4 is a front elevational view of the adapter ring illustrating the interaction of the adjustable screws and the resiliently deformable band to retain a relatively large diameter cylindrical member in coaxial alignment with the adapter ring.

FIG. 5 is a view similar to FIG. 4 but showing the interaction of the screws and resiliently deformable band to retain a relatively small diameter cylindrical member coaxially aligned with the adapter ring.

FIG. 6 is a view, partly in vertical section, showing the E-Adapter ring of the invention operatively interposed between a camera lens and the eyepiece of a telescope, the eyepiece of the telescope being held coaxially by the resiliently deformable band within the adapter ring.

FIG. 7 is a view similar to FIG. 6, but showing the E-Adapter ring of the invention utilized to retain two lens assemblies attached in coaxial arrangement on a camera.

FIG. 8 is an elevational view partly in section illustrating the E-Adapter ring of the invention as depicted in FIG. 3, equipped with a step-down coupler and T-ring utilized to connect a camera body without a lens assembly directly to the eyepiece of a microscope and utilizing the resiliently deformable band to retain the eyepiece coaxially arranged within the adapter ring.

FIG. 9 is a view illustrating the E-Adapter ring of the invention utilized to support a microscope eyepiece lens assembly in operative association with a video camera.

FIG. 10 is a chart illustrating graphically the versatility of the E-Adapter ring of the invention used with and without a T-ring and step-down coupler and C-ring.

FIG. 11 is a chart illustrating by comparison with FIG. 10 the limited applicability of the T-ring, coupler and C-ring systems in the absence of an E-Adapter ring.

DESCRIPTION OF THE PREFERRED EMBODIMENT

As indicated above, there are at least two different types of adapter rings that are used for specific purposes in conjunction with photographic equipment. The so-called T-ring discussed above, and the C-ring, are but examples. However, so far as I am aware, there is no adapter ring available that may be used as indicated graphically in FIG. 10 where the body of a single lens reflex camera (SLR) has applied to it a teleconverter tube, on which the lens of the camera is then mounted, followed by mounting of a filter if that is desired, followed by mounting of the E-Adapter ring of this invention on the filter, to enable the mounting of the foregoing assembly including the E-Adapter, onto the eyepiece of any of the thirteen optical apparatuses indicated in FIG. 10. In addition, also as indicated in FIG. 10, use of an E-Adapter ring of the invention mounted in conjunction with a T-ring, a T-Adapter and a T-E Coupler, the SLR body, without a lens, enables mounting of the same optical apparatuses, thus greatly expanding the applicability of T-system adapters. Still further, with an E-Adapter ring of the invention mounted as indicated above, an additional SLR camera lens may be mounted for use in connection with macro-photography. This level of versatility is not available with any other adapter ring known to me.

Accordingly, in terms of greater detail, the E-Adapter ring forming the subject matter of this invention in one of its aspects as shown in FIGS. 1, 2 and 3, is designated generally in the drawings by the numeral 2, and comprises a toroidal body 3 of generally quadrilateral cross-section symmetrical about a central axis 4 and possessed of an outer cylindrical periphery 6 and an inner cylindrical periphery 7. One end of the toroidal body is formed by a first face 8 defined by the inner periphery and a shoulder 9 formed by rabbetting a notch in the outer periphery. The cylindrical surface of the shoulder is provided with fine threads 12 of the type that will threadably mate with the threads universally found on the inner periphery of lens housings or filter elements as shown in FIG. 7. In addition, the inner periphery 7 of the toroidal body 3 adjacent the first face 8 is also formed with fine threads 13, useful for threaded connection of auxiliary equipment or a T-ring or T-Adapter ring or lens cap to the inner periphery of the toroidal body.

The opposite end of the toroidal body is formed with a second face 14 which includes a cylindrical shoulder 16 formed by rabbetting the outer peripheral edge of the body 3, the cylindrical surface of the shoulder being provided with fine threads 17 similar to the threads 12 on the shoulder 9. Preferably, the shoulders 9 and 16 are of the same diameter and are similarly threaded so that the E-Adapter ring may be turned end-for-end and detachably attached to a complementarily threaded structure or optical device, such as the threads on the inner periphery of a lens housing, or a filter ring, or a T-ring or T-Adapter ring as previously discussed.

As illustrated in FIG. 3, the second face 14 of the toroidal body 3 is provided with a cylindrical recess 18 of smaller diameter than the shoulder 16, thus providing a cylindrical inner periphery 19 coaxially related to the shoulders 9 and 16 and the central axis 4. The inner peripheral surface 19 is provided with fine threads 21 to which may be threadably engaged a conventional step-down coupler ring designated generally by the numeral 22 and having two sets 23 and 24 of different diameter outer peripheral threads. The threads 24 are sized to complement the inner peripheral threads 13 so that the coupler ring may be detachably applied to either side of the E-Adaptor ring. In addition, the threads 24 of the coupler ring are sized to be threadably engaged by a conventional T-ring designated generally by the numeral 26 and shown adjacent the coupler in coaxial alignment with the central axis and having a thread set 27 for detachable engagement with the threads 24, and a bayonet connector section 28 for detachable connection with the body of a SLR camera.

Referring again to FIG. 3, it will be seen that the second face 14 and the cylindrical recess 18 is also defined by a radially inwardly extending annular plate wall 29 having a central aperture 30 symmetrical with respect to the central axis, the plate being integral at its outer periphery with the inner periphery 7 of the toroidal body 3 intermediate the first and second faces as shown. The apertured shield plate 29 is relatively thin in comparison to the thickness of the toroidal body 3 measured in the direction of the central axis, being in the range of from 1/64" to 1/32" thick compared to a thickness of approximately 9/16" in an E-Adapter ring having an outer diameter of approximately $2\frac{1}{4}$". In the E-Adapter ring illustrated, the threaded shoulders 9 and 16 have a diameter of approximately $2\frac{1}{8}$", while the inner peripheral diameter of the cylindrical recess 18 approximates $1\frac{7}{8}$". In a prototype of the E-Adapter ring illustrated, the threaded inner periphery 7 has a diameter of approximately $1\frac{3}{8}$", while the central aperture 30 has a diameter of approximately 13/16". As illustrated in FIGS. 6, 8 and 9, the apertured plate wall 29 forms a protective shield against which the eyepiece may abut, thus preventing contact of the eyepiece with the lens or the interior of the camera body. It also prevents stray light from entering the camera, and defines the first and second recesses within the adapter ring corresponding, respectively, with the first and second faces of the E-Adapter ring.

The toroidal body 3 is provided at 120° intervals around its periphery with radially extending threaded bores 31 adapted to threadably and therefore adjustably receive the complementarily threaded shanks of three mounting screws 32. The mounting screws may conveniently be provided with a knurled head 33 and a hexagonal socket 34 so that each screw may be initially digitally adjusted, and ultimately, if needed, may be tightened by use of an appropriate tool. The inner ends of the screws may conveniently be provided with a rotatable bearing end 36 formed from a material such as an appropriate synthetic resinous material or a soft metal such as lead or silver which will not mar the surface of a cylindrical member against which it impinges. Non-marring of the surface may also be achieved by forming the bearing-end of the screw so that it rotates in relation to the screw so that when the bearing-end comes into frictional contact with a cylindrical member, the bearing does not rotate in relation to the cylindrical member, while permitting the screw to rotate to increase the pressure applied by the bearing against the surface it impinges.

While the mounting screws 32 may be turned down uniformly to impinge directly against a tubular member such as an eyepiece inserted coaxially into the E-Adapter ring of the invention, it is preferred that the E-Adapter ring mounting means include a thin cylindrical band 41 formed from elastically resilient metal such as spring steel. The cylindrical spring steel band is sufficiently smaller in diameter than the inner periphery 7 so that the outer periphery 42 of the band fits snugly into the recess associated with the first face and formed by the inner periphery 7 of the toroidal body 3 and the protective apertured shield plate 29.

In this position, the band, being essentially coaxially arranged within the inner periphery 7 when the mounting screws 32 are withdrawn so that their inner bearing ends 36 lie outside the boundary formed by the inner periphery, a cylindrical member 43, such as the eyepiece of a telescope or microscope to which the E-Adapter ring is to be attached, may be inserted into the inner periphery 44 of the resilient deformable band 41 and the mounting screws 32 adjusted so that their inner ends 36 come into abutting relationship with the outer periphery of the spring steel band. As illustrated in FIG. 4, the resilient radially inward deformation of the spring steel band occurs at three circumferentially spaced locations corresponding to the locations of the mounting screws 32, and in an amount sufficient for the inner periphery of the resilient steel band to engage the outer periphery of a cylindrical member 43 in the regions opposite the mounting screws.

The cylindrical member 43 gripped by the steel band as shown in FIG. 4 is only slightly smaller in diameter than the steel band itself, so that the band need not be deformed very much before it makes contact with the outer periphery of the cylindrical member. On the other hand, as shown in FIG. 5, the resiliently deformable steel band, which is nominally only about 0.010" thick, may be deformed extensively to grip the outer periphery of a much smaller diameter cylindrical member. By adjusting the screws 32 so that they project equally past the inner periphery 7, the spring steel band is deformed uniformly in the three regions associated with the screws, while the remainder of the spring steel band in the regions between the protuberances provided by the bearing ends of the screws remains in physical contact with the inner periphery 7 of the E-Adapter ring as shown.

In the embodiment of the invention as shown in FIGS. 1-3, the spring steel band is removable from the E-Adapter ring and has a width of about $\frac{1}{2}$", and when placed within the inner periphery 7, it overlaps the threads 13. Thus, with a band that wide, it is not possible to utilize the threads when the band is in place, however, the threads are available when the band is removed. Accordingly, it is within the contemplation of this invention, as illustrated in the embodiment of FIG.

3(A), that the spring steel band be only as wide as the portion of the inner periphery 7 that is devoid of threads, and that the spring steel band be permanently mounted within the body of the E-Adapter ring, thus obviating the necessity of inserting it each time it is to be used. There will of course be times when the E-Adapter ring is used in such a manner that the threads 13 will need to be used. Such an occasion might arise, for instance, when it is expedient to screw the threads 24 of a coupler ring 22 into the threads 13, so as to make the coupler available for use on the first face 9 of the E-adapter for attachment of structures.

Referring to FIGS. 6 through 9, it will be seen that in FIG. 6 the mounting screws 32 have been turned down upon the resiliently deformable spring steel band 41 to cause the inner periphery of the band to impinge on the outer cylindrical surface 43 of the eyepiece designated generally by the numeral 46. The E-Adapter ring body 3, however, is secured to the cylindrical flange 47 of the filter element 48 by engaging the threads 17 on the shoulder 16 with the threads usually found on the inner periphery of the flange 47 of the filter element. The filter element itself is attached in the usual manner by engagement of cylindrical flange 49 of the filter element with the threads usually found on the inner periphery of the lens housing extension 50. Thus, as shown, the filter element cooperates with the lens housing to detachably mount the E-Adaptor ring on the camera 51, while the E-Adapter ring is utilized to mount the eyepiece 46 to the camera.

Referring to FIG. 7, it will there be seen that the E-Adapter ring of the invention is mounted on the camera filter and camera in the same manner as in FIG. 6, but the spring steel band 41, while present, is not utilized. Rather, the auxiliary lens assembly designated generally by the numeral 52 is provided with an internally threaded cylindrical flange 53 that threadably and detachably engages the threads 12 formed on the outer periphery of the cylindrical shoulder 9 of the E-Adapter ring.

Referring to FIG. 8, here the camera 51 has had removed from it the conventional lens assembly illustrated in FIGS. 6 and 7, and the eyepiece 43 of a telescope or microscope or other optical device is detachably connected directly to the camera body through use of the E-Adapter ring 2 and cooperatively related auxiliary coupler ring 56 and bayonet T-ring 57. As shown the coupler ring 56 is similar to the coupler ring 22 of FIG. 3, and constitutes a flange 58 threaded to engage the threads 21 of the E-Adapter ring, and is also provided with a reduced diameter cylindrical portion 59 threaded externally to threadably detachably engage complementary internal threads on the bayonet T-ring 57, the bayonet flange of which is detachably engaged directly to the camera body in the aperture from which the lens has been removed. In this arrangement, the mounting screws 32 of the E-Adapter ring are utilized to resiliently deform the spring steel band 41 into engagement with the outer periphery of the eyepiece 43 of the telescope or microscope or other optical apparatus as shown, retaining that apparatus properly positioned in relation to the camera body.

The versatility of the E-Adapter ring of the invention is again illustrated in FIG. 9 in which the E-Adapter ring is utilized to quickly and easily detachably connect a movie or video camera 61 or camcorder to the cylindrical outer periphery of the eyepiece 43 of a telescope or microscope. In this arrangement, the E-Adapter ring 2 is arranged coaxially about the eyepiece and the mounting screws 32 are turned down to resiliently deform the spring steel band into binding contact with the outer periphery of the eyepiece as shown. An auxiliary coupler ring 62 similar to the ring 22 of FIG. 3 is then threadably detachably engaged with the threads 21 of the E-Adapter ring. The auxiliary coupler ring 62 is provided with a threaded shoulder 63, as previously described in connection with FIG. 8, adapted to threadably receive the complementarily threaded cylindrical flange 64 of reducing adapter ring 66, equipped with a cylindrical extension 67 that threadably engages the lens opening of the camera as shown. The eyepiece of the telescope, microscope or other optical device is thus held in accurate coaxial arrangement with the optical axis of the camera through the use of the E-Adapter ring 2.

From the foregoing, it will be clear that the E-Adapter ring of the invention increases the versatility of optical equipment by enabling the attachment of a camera, with or without a lens assembly, to cooperatively associated optical apparatus such as telescopes and microscopes or other optical devices, in a manner not heretofore possible. In making up such interconnections between cameras and associated optical equipment, it is important that the camera be securely attached so that no jiggling of the camera occurs. I have found that clamping the resiliently deformable spring-steel band about the cylindrical eyepiece provides physical contact of the band over its entire width with the underlying cylindrical surface and retains the camera in a very stable non-jiggling attitude on the eyepiece. The resiliently deformable band also aids in centering the eyepiece in the E-Adapter ring, with consequent alignment of the respective optical axes of camera and eyepiece.

Having thus described the invention, what is believed to be new and novel and sought to be protected by Letters Patent of the United States is as follows.

I claim:

1. An adapter ring to facilitate mounting of a single lens reflex camera on an outer tubular periphery of an eyepiece of an associated optical device such as a telescope or microscope so that the optical axes thereof coincide, comprising:
   (a) a toroidal monolithic body having inner and outer peripheries symmetrical about a central axis and having first and second faces connecting said inner and outer peripheries;
   (b) a set of at least two coaxially arranged coextensive threaded sections formed on said toroidal body and associated with said second face;
   (c) at least one threaded section coaxially formed on said toroidal body and associated with said first face;
   (d) a centrally apertured plate perpendicular to the central axis and integral with said toroidal body intermediate said first and second faces and defining first and second recesses associated, respectively, with said first and second faces on opposite sides of said centrally aperture plate; and
   (e) means mounted on said toroidal body and adjustable to engage the outer tubular periphery of the eyepiece of the associated optical device inserted coaxially into said first recess.

2. The adapter ring according to claim 1, in which a set of two coaxially arranged threaded sections are formed on said toroidal body associated with said first face.

3. The adapter ring according to claim 1, in which one of said two coaxially arranged coextensive threaded sections associated with said second face is coaxially aligned with said at least one threaded section associated with said first face.

4. The adapter ring according to claim 1, in which one of said two coaxially arranged coextensive threaded sections associated with said second face is formed on the inner periphery of said second recess.

5. The adapter ring according to claim 1, in which said at least one threaded section associated with said first face is formed on the outer periphery of said toroidal body.

6. The adapter ring according to claim 1, in which one of said two coaxially arranged coextensive threaded sections associated with said second face is formed on said outer periphery in axially spaced coaxial alignment with said at least one threaded section associated with said first face and formed on said outer periphery of said toroidal body.

7. The adapter ring according to claim 1, in which said at least one threaded section coaxially formed on said toroidal body and associated with said first face is formed on the inner periphery of said first recess.

8. The adapter ring according to claim 1, in which said means mounted on said toroidal body and adjustable to engage the eyepiece of an associated optical device includes a plurality of radially extending circumferentially spaced mounting screws adjustable to selectively penetrate said recess associated with said first face.

9. The adapter ring according to claim 1, in which said means mounted on said toroidal body and adjustable to engage the eyepiece of an associated optical device includes a resiliently deformable band mounted in said first recess.

10. The adapter ring according to claim 8, in which said means mounted on said toroidal body and adjustable to engage the eyepiece of an associated optical device includes a resiliently deformable band mounted in said first recess whereby when said mounting screws are selectively adjusted to penetrate said first recess said resiliently deformable band is deformed to engage and retain an eyepiece inserted into said first recess.

11. In combination with an optical device having a tubular cylindrical eyepiece and a camera having coincident optical axes;
  (a) an adapter ring fixedly joining said camera and said optical device and including a toroidal monolithic body having inner and outer peripheries symmetrical about a central axis and joined by first and second faces;
  (b) means on said toroidal body associated with said first face selectively adjustable to impose a radially directed force for fixedly engaging the tubular cylindrical eyepiece of said optical device; and
  (c) means on said toroidal body associated with said second face fixedly engaging said camera.

12. The combination according to claim 11, in which said means for fixedly engaging said optical device includes a plurality of radially extending circumferentially spaced mounting screws selectively adjustable on said toroidal body to penetrate past said inner periphery and engage said tubular cylindrical eyepiece.

13. The combination according to claim 11, in which said means for fixedly engaging said optical device includes a resiliently deformable band normally conforming to the inner periphery of said toroidal body and selectively resiliently deformable radially inwardly to engage the optical device at circumferentially spaced intervals.

14. The combination according to claim 11, in which said means on said toroidal body for fixedly engaging said camera includes a threaded section formed on the outer periphery of said toroidal body adjacent said second face.

15. The combination according to claim 11, in which said toroidal body is provided with a centrally apertured plate perpendicular to the central axis of said toroidal body and having an outer periphery integral with the inner periphery of said toroidal body intermediate said first and second faces and defining first and second recesses associated, respectively, with said first and second faces, and said optical device extends into said first recess and the optical axis of said optical device and the central axis of said apertured plate coincide.

16. The combination according to claim 11, in which said toroidal body is provided with a centrally apertured plate perpendicular to the central axis of said toroidal body and having an outer periphery integral with the inner periphery of said toroidal body intermediate said first and second faces and defining first and second recesses associated, respectively, with said first and second faces on opposite sides of said centrally apertured plate; said means on said toroidal body associated with said second face for fixedly engaging said camera includes a threaded section formed on the outer periphery of said toroidal body adjacent said second face; and said means on said toroidal body associated with said first face for fixedly engaging said optical device includes a plurality of circumferentially spaced radially extending mounting screws selectively adjustable into or out of said first recess in a direction parallel to said centrally apertured plate and perpendicular to said central axis whereby said optical device is clamped therebetween and held in coaxial alignment with the optical axis of the camera.

17. The combination according to claim 14, in which said means on said toroidal body for fixedly engaging said camera includes a coupling ring threadably engaging said threaded section formed on the outer periphery of said toroidal body adjacent said second face, and a T-ring threadably engaging said coupling ring and having bayonet connection means detachably engaging said camera.

18. The combination according to claim 16 in which said means on said toroidal body associated with said first face for fixedly engaging said optical device includes a resiliently deformable band normally conforming to the inner periphery of said first recess and selectively resiliently deformable radially inwardly at circumferentially spaced intervals to engage said optical device when said mounting screws are adjusted to engage and deform said resiliently deformable band to thereby retain the optical device and camera so that their respective optical axes coincide.

19. The combination according to claim 18, in which said optical device abuts said centrally apertured plate concentrically about the aperture therein, said resiliently deformable band prevents lateral and axial displacement of said optical device, and said centrally apertured plate enables light to pass between said optical device and said camera through the central aperture thereof but prevents stray light from entering the camera.

* * * * *